United States Patent [19]

Burrowes et al.

[11] Patent Number: 5,356,939
[45] Date of Patent: Oct. 18, 1994

[54] PROCESS FOR MAKING RUBBER ARTICLES AND RUBBER ARTICLES MADE THEREBY

[75] Inventors: Thomas G. Burrowes, Lincoln; Bobby L. Purviance, Hickman; Charles W. Quiner; Delyn M. Stork, both of Lincoln, all of Nebr.

[73] Assignee: The Goodyear Tire & Rubber Company, Akron, Ohio

[21] Appl. No.: 78,956

[22] Filed: Jun. 21, 1993

Related U.S. Application Data

[63] Continuation of Ser. No. 932,411, Aug. 19, 1992, abandoned.

[51] Int. Cl.⁵ .............................................. C08J 11/04
[52] U.S. Cl. .................................. 521/41.5; 521/41; 521/43.5; 521/44.5; 525/236; 525/237; 525/331.9; 525/332.5
[58] Field of Search ...................... 521/41, 41.5, 43.5, 521/44.5, 525, 526; 525/236, 237, 331.9, 332.5

[56] References Cited

U.S. PATENT DOCUMENTS

| | | | |
|---|---|---|---|
| 3,687,873 | 8/1972 | Kropscott et al. | 521/44.5 |
| 4,046,834 | 9/1977 | Lee et al. | 521/43.5 |
| 4,052,344 | 10/1977 | Crane et al. | 521/44.5 |
| 5,157,082 | 10/1992 | Johnson | 525/232 |

FOREIGN PATENT DOCUMENTS

| | | | |
|---|---|---|---|
| 0105431 | 6/1982 | Japan | 524/526 |
| 0246879 | 12/1985 | Japan | 521/41.5 |

*Primary Examiner*—Paul R. Michl
*Assistant Examiner*—Olga Asinovsky
*Attorney, Agent, or Firm*—Marc R. Dion, Sr.

[57] ABSTRACT

A process of producing a rubber article which is economical and environmentally beneficial in that it provides for the recycling of ground cured rubber into uncured rubber compositions which need only be molded or shaped into their final form.

7 Claims, No Drawings

PROCESS FOR MAKING RUBBER ARTICLES AND RUBBER ARTICLES MADE THEREBY

This is a continuation of application Ser. No. 07/932,411 filed on Aug. 19, 1992, now abandoned.

FIELD OF THE INVENTION

This invention relates to rubber articles. More particularly, it relates to a process of making rubber articles. The rubber articles and the process are economical and environmentally beneficial.

BACKGROUND OF THE INVENTION

It has been known since the mid 1800's of the benefits of recycling rubber. Much work has been done to devise methods of recycling rubber through reclaiming and the use of various chemical additives to revulcanize the recycled rubber. See, for example, the references cited in U.S. Pat. No. 4,244,841. Furthermore, there is produced each year vast quantities of ground cured rubber from operations such as the grinding of used tires and the grinding and buffing of various rubber articles such as transmission belts, conveyor belts and tire carcasses in recapping operations.

With the proliferation of the health and fitness industry, there has been a great increase in products for the health and fitness enthusiasts to be used not only at home, but also at fitness clubs, gymnasiums, resorts, hotels and schools. Most of these products have handlebars and/or pads of some type to either provide a surer grip or to absorb impacts. Of late, the handlebar grips used on this fitness equipment have been made from foamed thermoplastics and thermosets which, unfortunately, act as a sponge to absorb perspiration which can lead to the emanation of the familiar "gymnasium" odor. This is undesirable especially for units used in the home. In addition, the foamed articles present a sanitation problem of not being readily washable to prevent the transference of residual perspiration between individual users.

SUMMARY OF THE INVENTION

We have discovered a method for making rubber articles which have utility on various pieces of fitness equipment and are non-moisture absorbing, nonmarking, ozone resistant, shock absorbing, economical and environmentally beneficial. Accordingly, there is provided a process for producing a rubber article which comprises:

a. providing an uncured rubber composition comprising:
  i. 100 parts by weight of a raw rubber in admixture with
  ii. from 10 to 330 phr of a cured ground rubber based on i.; and shaping the composition into a rubber article.

DETAILED DESCRIPTION OF THE INVENTION

It should be noted at the outset that the process is completely devoid of a vulcanization step which makes it economical from a labor saving standpoint as well as not a further drain on our dwindling energy supply. In addition, it can be appreciated that the rubber composition itself can be more economical since it can be devoid of any curative chemicals.

The term "raw rubber" as used herein embraces both natural rubber (NR) and all its various raw and reclaimed forms as well as various synthetic rubbers. Among the synthetic rubbers which can be useful as the raw rubber in the present invention are polyisoprene (IR), polychloroprene (CR), polybutadiene (BR), styrene butadiene rubber (SBR), acrylonitrile butadiene rubber (NBR), ethylene propylene diene monomer (EPDM), butyl rubber (IIR), halobutyls, chlorinated polyethylene (CPE), and chlorosulfonated polyethylene (CSM). While the raw rubbers can be used in any combination, it is preferred that at least a portion of the raw rubber contain up to about 30 parts of solution SBR.

The cured ground rubber, depending upon its source, will have a particle size from about 3 mesh to about 450 mesh. Ground rubber obtained from the grinding dust of power transmission belts can generally be polychloroprene (CR). If the ground rubber is obtained from the grinding of used tires, the ground rubber can be a mixture of BR and SBR.

In addition to the two rubber components, the composition generally contains up to about 15 phr of processing aids based on the weight of the raw rubber. The processing aids can be any one of a number of waxes or stearic acids or zinc oxide or a combination of those. It has also been found to be beneficial from an aesthetic standpoint to include a small quantity, less than 1 phr of a perfume. While the cured ground rubber is present at a level of from 10 to 330 phr, it is preferred that the ground rubber be used at a level of from 30 to 165 phr and it is most preferred that the ground rubber be present at a level of from 50 to 110 phr.

The method of mixing the raw polymer and the ground rubber and any processing aids can be any one of those well known in the art such as milling or an internal mixer such as a Banbury. The method of shaping the rubber articles again can be any one of the well known methods used in the rubber industry such as extrusion in the form of a tube for use such as a handlebar grip or milling or calendering for flat stock such as gymnasium mats, railroad tie pads, or shock absorption pads.

More complicated shapes can be provided with the use of appropriate molding operations.

It has been found that the rubber articles of the present invention are non-moisture absorbing, particularly in comparison to the presently used foamed thermoplastics and thermosets. They are also non-marking as compared to articles made from compositions containing carbon black. This has been determined simply by using a slab of the present composition as an eraser across a white piece of paper which did not leave a mark as compared to a rubber composition wherein the ground rubber was replaced by carbon black and wherein when a slab of that composition was used as an eraser across a white piece of paper, it left a black mark.

It has also been found that the composition of the present invention has superior ozone resistance according to ASTM Test Method D-1149, wherein samples were exposed without stretch to 100 parts per 100 million ozone concentration at a temperature of 100° F. for 14 days without any signs of cracking or other signs of deterioration.

As previously mentioned the rubber articles of the present invention are impact absorbing. In a similar comparison with the composition wherein the ground rubber was replaced by carbon black, an impact test was devised wherein a 3 lb. steel cylinder was dropped on the sheeted out sample from a height of 5 inches (1.25 ft-lb of energy). A Bruel and Kjaer (B and K) type 4375 accelerometer was mounted at the top of the cylinder. The cylinder was slid along a ½ steel shaft to assure a controlled impact. The samples were held down rigidly on a 1″ thick plate of steel. Signals from the accelerometer were sent to a B and K type 2032 signal analyzer. Plots taken of the test results showed that the composition of the present invention to exhibit an acceleration of 250 g's and that the carbon black loaded composition yielded an acceleration of 360 g's; the difference in these two values, 110 g's, times the weight of the cylinder which is 3 lbs. equals an impact absorption of 330 lbs force for the present composition over the carbon black loaded composition.

As it can be well appreciated, the process of the present invention can greatly benefit the environment by providing an outlet for a non-biodegradable material such as ground rubber. In, addition it can be appreciated that should the rubber articles of the present invention become unusable after a period of time that the article itself can be resubmitted to the shaping steps without need of further recomposition. It is also contemplated that there are other uses for the process and the composition of the present invention, such as floor mats, workbench covers, truck bed liners, etc.

While certain representative embodiments and details have been shown for the purpose of illustrating the invention, it will be apparent to those skilled in this art that various changes and modifications may be made therein Without departing from the spirit or scope of the invention.

What is claimed is:

1. A process for producing a rubber article containing uncured rubber comprising:
   a. providing an uncured rubber composition devoid of any curing agents comprising:
      i. 100 parts by weight of a raw rubber in admixture with
      ii. from 10 to 330 phr of a cured ground rubber based on i.; and
   b. shaping said composition into a rubber article.

2. The process according to claim 1 wherein the ground rubber is present at a level of from 30 to 165 phr.

3. The process according to claim 1 wherein the ground rubber is present at a level of from 50 to 110 phr.

4. The process according to claim 1 wherein the raw rubber is at least one raw rubber selected from the group consisting of NR, IR, CR, BR, SBR, NBR, EPDM, CPE, CSM, IIR and halobutyls.

5. The process according to claim 1 wherein the uncured rubber composition is further comprised of up to 15 phr of processing aids based on i.

6. The process according to claim 1 wherein the ground rubber has a particle size from 3 mesh to 450 mesh.

7. A rubber article produced according to the method of claim 1.

* * * * *